C. H. LATHAM.

Improvement in Milk-Coolers.

No. 132,473.      Patented Oct. 22, 1872.

Witness:
James E. Hutchinson
C. L. Evert

Inventor.
C. H. Latham.
per Alexander Mason
Attorneys.

UNITED STATES PATENT OFFICE.

CORNELIUS H. LATHAM, OF RANDOLPH, NEW YORK.

IMPROVEMENT IN MILK-COOLERS.

Specification forming part of Letters Patent No. 132,473, dated October 22, 1872.

*To all whom it may concern:*

Be it known that I, CORNELIUS H. LATHAM, of Randolph, in the county of Cattaraugus and in the State of New York, have invented certain new and useful Improvements in Milk-Cooler; and do hereby declare that the following is a full, clear, and exact description thereof, reference being had to the accompanying drawing and to the letters of reference marked thereon making a part of this specification.

The nature of my invention consists in the construction and arrangement of a series of pans for cooling milk, as will be hereinafter more fully set forth.

In order to enable others skilled in the art to which my invention appertains to make and use the same, I will now proceed to describe its construction and operation, referring to the annexed drawing, in which—

Figure 1:
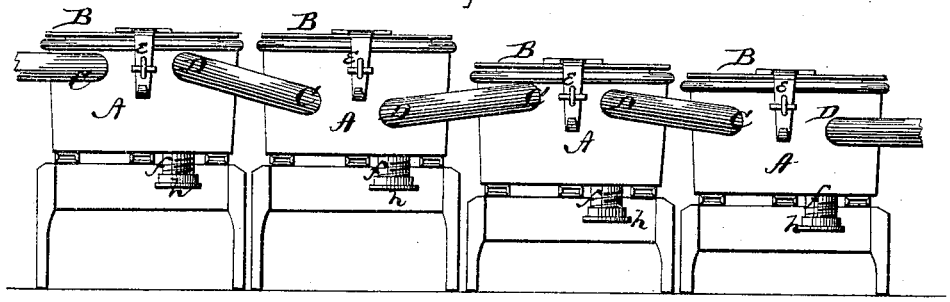
Figure 2:
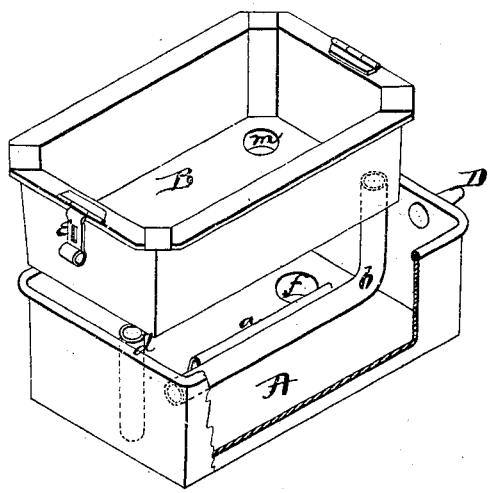

Figure 1 represents an end view of a series of my milk-pans; and Fig. 2 is a perspective view of one of said pans.

Each of my milk-pans is composed of two pans, A and B, one placed within the other, and which may be of any desired shape or size, the inside one, B, being half an inch, more or less, smaller on every side than the outside one, A. On the bottom of the outside pan A is soldered a strip, *a*, running lengthwise with the pan for a suitable distance and projecting upward for about half an inch, for the purpose of keeping the pans from coming together at the bottom. In the outside pan is then placed a piece, *b*, of rubber pipe sufficiently long to reach down one end of the pan and nearly the entire length of the bottom, and another piece, *d*, to reach from the top to near the bottom of the other end, so as to leave a space sufficient for the water to pass between the ends of said pipes, this space to be at the end of the pan opposite to that where the water enters. The top or inside pan B is then pressed down on the rubber which makes it tight, so that the water will have to pass to the opening between the two pieces of rubber and back on the opposite side and out at or near the top of the pan. The pans A and B are fastened together at or near the top by a hoop, *e*, or other suitable device, to prevent the inside or top pan from floating. C is the inlet, and D the outlet for the water to and from the space between the two pans A and B.

The milk-pans thus constructed are usually set on separate benches, but may be set on a rack one above the other, if desired; or they may be separate around the room, or four set together, two and two with the inlet and outlet for the water between the pans.

The water enters the pan A of the first milk-pan at the top, and passes to the other end of the pan to the bottom and back to the outlet D, which is about an inch lower than the inlet. The inlet C of the next pan should be enough lower to receive the water from the first pan. The next two pans may be set enough lower to receive the water at the top as the first two, or the inlet and outlet may be lower down on the pans and the pans set on a level.

The cooling of the milk by this method is thorough and effectual, it takes less water, and is quicker done, as it forms a current all around the pan.

In the bottom of the lower or outer pan A is a short tube, *f*, with a screw-cap, *h*, on the end, through which the water may be drawn off; and in the bottom of the top or inner pan B is a similar short tube, *m*, which enters the tube *f*, and should be provided with a stop-cock. After the water has been drawn off this stop-cock may be opened to withdraw the milk.

An inside cooler may also be used in each milk-pan, said inside cooler consisting of an angular or serpentine tube placed in the inside pan, the water running through the same continuously.

Having thus fully described my invention, what I claim as new, and desire to secure by Letters Patent, is—

1. A pan for cooling milk, consisting of two pans, A and B, one within the other, and the outside pan A provided with strip *a* and rubber tubes *b d*, substantially as and for the purposes herein set forth.

2. In combination with the double pan A B the tube $f$ with screw-cap $h$, tube $m$ with stop-cock, and the fastenings, $e$, all constructed and arranged substantially as and for the purposes herein set forth.

3. A series of double milk-pans, A B, constructed as herein shown and described, and arranged with their inlets and outlets, substantially in the manner and for the purposes herein set forth.

In testimony that I claim the foregoing I have hereunto set my hand this 31st day of August, 1872.

C. H. LATHAM.

Witnesses:
    C. L. EVERT,
    HIRAM FOSDICK.